US 6,625,758 B1

(12) United States Patent
Singh

(10) Patent No.: US 6,625,758 B1
(45) Date of Patent: Sep. 23, 2003

(54) METHOD AND APPARATUS FOR AUTOMATED SYSTEM LEVEL TESTING

(75) Inventor: Satwant Singh, San Jose, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 536 days.

(21) Appl. No.: 09/604,267

(22) Filed: Jun. 26, 2000

(51) Int. Cl.⁷ ............................................... H02H 3/05
(52) U.S. Cl. .................................................... 714/25
(58) Field of Search ........................... 714/25, 37, 46, 714/47; 324/754, 760

(56) References Cited

U.S. PATENT DOCUMENTS

| 4,593,820 A | * | 6/1986 | Antonie et al. | ............. 209/573 |
| 5,583,875 A | * | 12/1996 | Weiss | ........................ 714/745 |
| 5,937,154 A | * | 8/1999 | Tegethoff | ...................... 714/30 |
| 6,097,201 A | * | 8/2000 | Slocum | ...................... 324/760 |
| 6,384,361 B1 | * | 5/2002 | Vijaykumar | ................ 209/573 |

* cited by examiner

Primary Examiner—Dieu-Minh Le

(57) ABSTRACT

A system-level (SLT) of a CPU device is performed in an automated test environment. Each device under test is automatically placed an SLT station and a test is performed at an initial operating speed. A CPU device which passes the test is then automatically removed and placed in a storage container based on that operating speed, also known as a rating (or rated) speed. If the device fails the test, however, then it remains in the test station and the operating speed of the station is adjusted until the device is able to pass the test. Once successful, the device is automatically removed and placed in a storage container based on the operating speed at which it finally was successful. A device which is unable to pass a system-level test at any speed is automatically removed and placed in a reject bin. This testing procedure is repeated for a number of devices without requiring manual intervention to place the device in the SLT station, adjust the test operating speed, or binning the CPU device according to its rated speed.

16 Claims, 2 Drawing Sheets

METHOD AND APPARATUS FOR AUTOMATED SYSTEM LEVEL TESTING

FIELD OF THE INVENTION

The present invention relates to testing electronic devices, and more particularly to automating the testing of electronic devices at different operating speeds.

BACKGROUND OF THE INVENTION

Many different characteristics of electronic devices are tested during and after their manufacturing process. One critical determination for many devices is identifying a maximum operating speed for which a device is rated. Due to manufacturing and processing variations of semiconductor devices, two similarly constructed devices often have different operating characteristics. One method of determining the rated operating speed of a device is to perform system-level tests at a clock speed and determine if either success or failure occurs. By system-level tests, it is meant that the device is tested in the environment and configuration in which it is to be ultimately used.

The current methods and systems for system-level testing CPU devices, or microprocessors, are time consuming and labor intensive, and therefore expensive as well. Typically, a device under test is manually inserted into a test station that operates at a specific fixed speed. At this station, a system level test is performed, automatically or under manual supervision, and after completion an operator manually separates CPU devices which pass from CPU devices which fail. The devices which pass are rated at the test station's operating speed while the devices which fail are transported to a different test station with a lower operating speed. This cycle of testing, sorting and transporting is repeated until every CPU device is rated at some operating speed or outright rejected.

A similar arrangement, also known in the art, is to have a system test station which has a manually configurable speed setting. In this instance, the station's operating speed is set, a plurality of CPU devices are tested, the operating speed is manually lowered, and then all failing devices are re-tested. This testing sequence is repeated until all CPU devices eventually pass at some operating speed or are ultimately rejected.

SUMMARY OF THE INVENTION

The prior art fails to provide an efficient and error-free method of performing system level tests. The manual nature of these previous methods for part placement, testing, and sorting leads to errors such as improperly inserted devices, incorrect error determinations, and inefficient device sorting.

This and other needs are met by embodiments of the present invention which provide system-level testing (SLT) of a CPU device that is performed in an automated test environment. Each device under test is automatically placed in the SLT station and a test is performed at an initial operating speed. A CPU device which passes the test is then automatically removed and placed in a storage container based on that operating speed, also known as a rating (or rated) speed. If the device fails the test, however, then it remains in the test station and the operating speed of the station is adjusted until the device is able to pass the test. Once successful, the device is automatically removed and placed in a storage container based on the operating speed at which it finally was successful. A device which is unable to pass a system-level test at any speed is automatically removed and placed in a reject bin. This testing procedure is repeated for a number of devices without requiring manual intervention to place the device in the SLT station, adjust the test operating speed, or binning the CPU device according to its rated speed.

The foregoing and other features, aspects and advantages of the present invention will become more apparent from the following detailed description of the present invention when taken in conjunction with the accompanying drawings.

DETAILED DESCRIPTION

Figure 1:
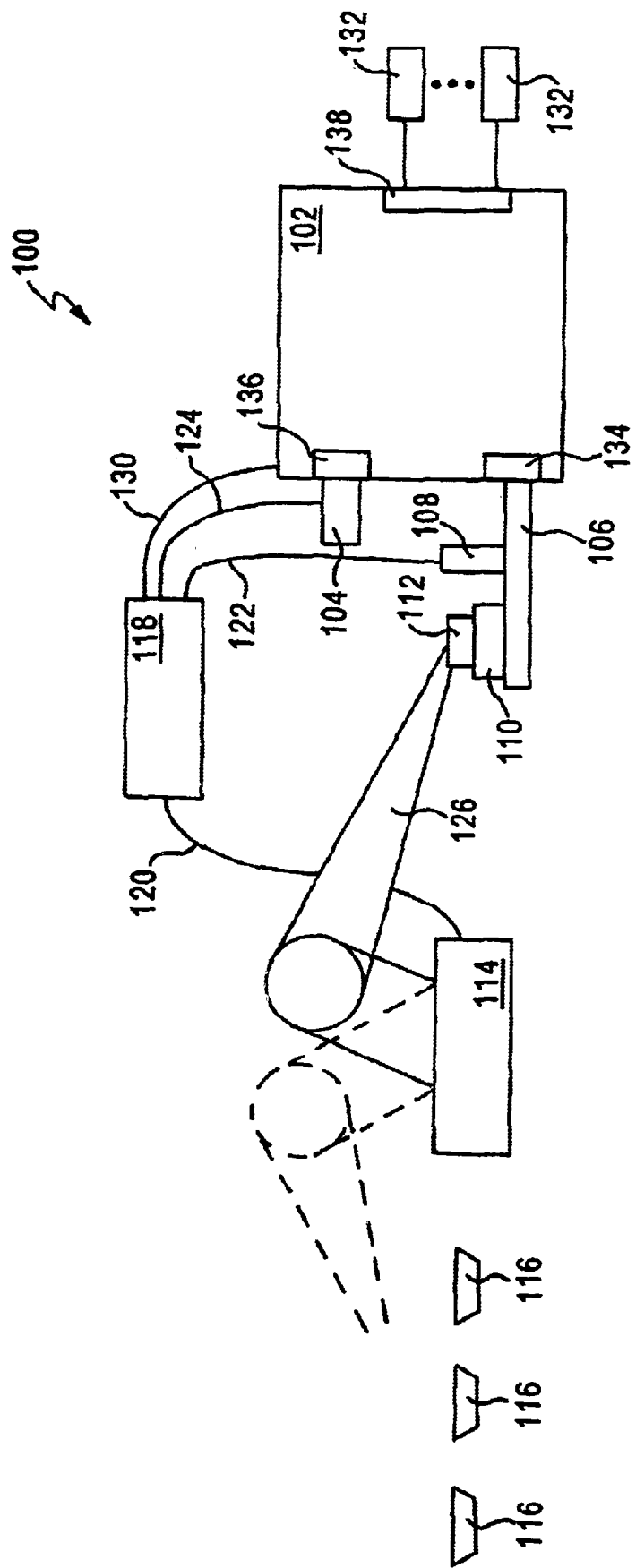
FIG. 1 illustrates an embodiment of a system-level testing station according to the present invention.

FIG. 1 illustrates a system-level testing station according to one embodiment of the present invention. In this figure, a unique element number has been assigned to each functional feature. The resulting drawing and description reflect these assignments, but are not intended to limit the scope of the present invention. For example, different functional features such as system controller 118 and robot controller 114 can be combined into a single, physical component without departing from the scope contemplated by the present invention.

A brief introduction to all the elements of FIG. 1 is presented below. Device under test 112 fits into the socket 110 on a daughtercard 106. The daughtercard 106 connects to the motherboard 102 and also has a connection for a speed card 108. The motherboard 102 includes the components of a typical computer motherboard such as a BIOS, system memory, system bus cache, disk controllers, etc. Peripheral devices 132 such as hard drives, video displays and power supplies are also connected to the motherboard 102. A debug card 104 is attached to motherboard 102 and monitors the system bus and outputs diagnostic codes to a system controller 118. System controller 118 is a programmable digital-logic system which connects with and controls the other elements of the test system 100. System controller 118 connects with the speed card 108 through medium 122, with the debug card 104 through medium 124, with the motherboard 102 through medium 130, and a robot controller 114 through medium 120. Robot controller 114 directs the movement of a picker/placer arm 126 to place a device under test 112 into the socket 110 or to place a device 112 into a selected one of a number of speed bins 116. These connections support two-way communication between the system controller 118 and the other components.

A more detailed description of each element as well as their functional arrangement is now provided.

Daughtercard 106 holds the CPU device under test 112 and receives the clock card 108. Typically, a traditional computer motherboard accepts a CPU on an attached socket and operates the CPU at an operating speed according to clock circuitry also directly on the motherboard. In the test system 100 of the present invention, the CPU device under test 112 and clock card 108 are located off the motherboard 102 and reside on the daughtercard 106 which is electrically connected to the motherboard 102 and its system bus through interface circuitry 134. Motherboard 102 also connects to peripherals 132 through interface 138. Typical peripherals such as, but not limited to, a power supply, hard drive, CD-ROM, multimedia devices, etc. are connected to motherboard 102. The arrangement of the daughtercard 106, the motherboard 102 and peripherals 132 functionally simulate a computer system so that system-level tests of the CPU device 112 can be performed.

One arrangement for conducting a system-level test requires a hard drive 132 to be connected to the motherboard 102. On the hard drive 132 is at least one bootable partition to automatically load an operating system when the motherboard 102 is reset or power is first applied. Also stored on the hard drive 132 are applications or other software which can run in an automatic manner. Finally, a test script is also stored on the hard drive 132 which is automatically executed when the operating system first loads and steps through execution of the installed applications in order to test the CPU device under test 112.

Also connected to the daughtercard 106 is a clock card 108. The clock card 108 has adjustable clock circuitry which controls the speed at which the CPU device 112 is operated. The clock card 108 is preferably a voltage controlled oscillator in certain embodiments and receives data, in a latch or register, from the system controller 118 that sets a selectable voltage on the card 108 and thus controls the operating clock frequency. Alternative methods of selecting an operating speed are also considered within the scope of the present invention. Some alternatives include multiple crystal oscillators which are selectable/deselectable by the system controller 118, or a divide-by-n counter which divides a master clock pulse train by n according to the settings received from the system controller 118.

Debug card 104 is connected through an interface 136 to the motherboard 102 and its system bus. The debug card 104 monitors the various bus lines during system boot-up and operation to detect failures and to report diagnostic codes to the system controller 118. Commercially available debug cards as well as customized debug cards are considered within the scope of the present invention. When system failures occur, low-level BIOS routines on the motherboard 102 report diagnostic codes on the system bus which identify the type of failure which occurred. The debug card 104 senses the diagnostic code on the system bus and makes it available in a latch or register for the system controller 118.

Robotic picker/placer arm 126 is controlled by a controller 114 as is known in the art. The arm has at least the functionality to perform picking and placing of the CPU device under test 112. The arm 126 picks a CPU device from a tray or other carrier and places it into socket 110. After a test of the device 112 is complete, the arm 126 then removes the device 112 and places it in one of the containers or "speed bins" 116. Based on the testing of the device under test 112, the system controller 118 provides the determined speed rating information through connection 120 so that the arm 126 places the device 112 in the appropriate bin 116 according to this speed rating information. These containers 116 are preferably positioned according to rating speeds so that a device rated at 500 MHz can be placed in a different container than a device which successfully passes the system-level test at 400 MHz.

System controller 118 interconnects with nearly every other component of the test system 100. As briefly described earlier, in the exemplary embodiment, the system controller 118 is a programmable, digital-logic system such as a personal computer or other customized processing unit. In operation, the controller 118 instructs robotic controller 114 to pick and place the device under test 112 onto the daughtercard 106. The controller 118 then communicates through connection 130 to power-up the motherboard 102. Although the connection 130 is depicted as connecting to the motherboard 102, an alternative is to provide power-up and reset capability on the daughtercard 106 and have the connection 130 terminate there. When powering up for the first time, the CPU device under test 112 is operated at an initial, default operating speed selectably configured on the speed card 108. As the system continues to boot-up and run through automated testing procedures, the debug card 104 monitors the system bus of the motherboard 102 to detect faults.

The system controller 118 polls the debug card 104 to determine if a fault occurs while testing the CPU device 112. Interrupt detection of faults is also contemplated within the scope of the present invention. In this alternative, the debug card 104 asserts an interrupt input to system controller 118 to notify it that a fault has occurred. A test evaluation portion of the system controller 118 determines the pass or fail condition of the device under test 112. A "no fault" condition can be detected by either a timer expiring on the controller 118 without a fault condition being detected or an explicit "CPU good" code outputted by the debug card 104. On the other hand, when a fault does occur, the error code is interpreted by the controller 118. Some failures, like basic power-up faults, indicate the CPU device under test 112 is a faulty component at any speed and that it should be rejected. Other types of faults simply indicate the CPU device 112 failed at the particular operating speed of the clock card 108 and is potentially a good component at some other speed.

When the controller 118 detects this second type of error it instructs the components of the test system 100 to retest the CPU device under test 112. In particular, a clock adjuster portion of the controller 118 writes data to the speed card 108 that changes its operating speed to a next lower test speed. Part of the programmable logic of controller 118 includes information regarding the correct manner of affecting a speed change in a particular speed card 108 and information regarding the devices under test and the range of frequencies at which they need to be tested. One example of operating frequencies for testing would be to first test at 750 MHz, then 700 MHz, then 600 MHz, the 550 MHz, then 475 MHz and then 300 MHz.

After the next operating speed for testing is set in the speed card 108, the motherboard 102 is reset and the testing sequence repeats. The controller 118 maintains data regarding the current operating speed of the test system so that a determination of a device's speed rating can be performed. This testing sequence repeats until either the device under test 112 passes; it fails at the lowest test speed; or a rejection-type failure occurs.

If the controller 118 steps through the entire range of test speeds and the CPU device 112 never passes the test, then the device 112 is rejected. When a device under test 112 is rejected, the controller 118 instructs the robotic arm 126 to remove the device 112 from the daughtercard 106 and place it in an appropriate container 116.

Typically, however, a device under test 112 eventually succeeds at one of the operating speeds. When this occurs, the controller 118 powers-down the motherboard 102, removes the CPU device under test 112 and instructs the robotic arm 126 to place the device 112 into a container 116 according to the operating speed at which it passed the test. The robotic arm 126 is then instructed to retrieve an untested device; the speed card 108 is reset to its default operating speed, and testing continues with a new device under test 112.

Figure 2:
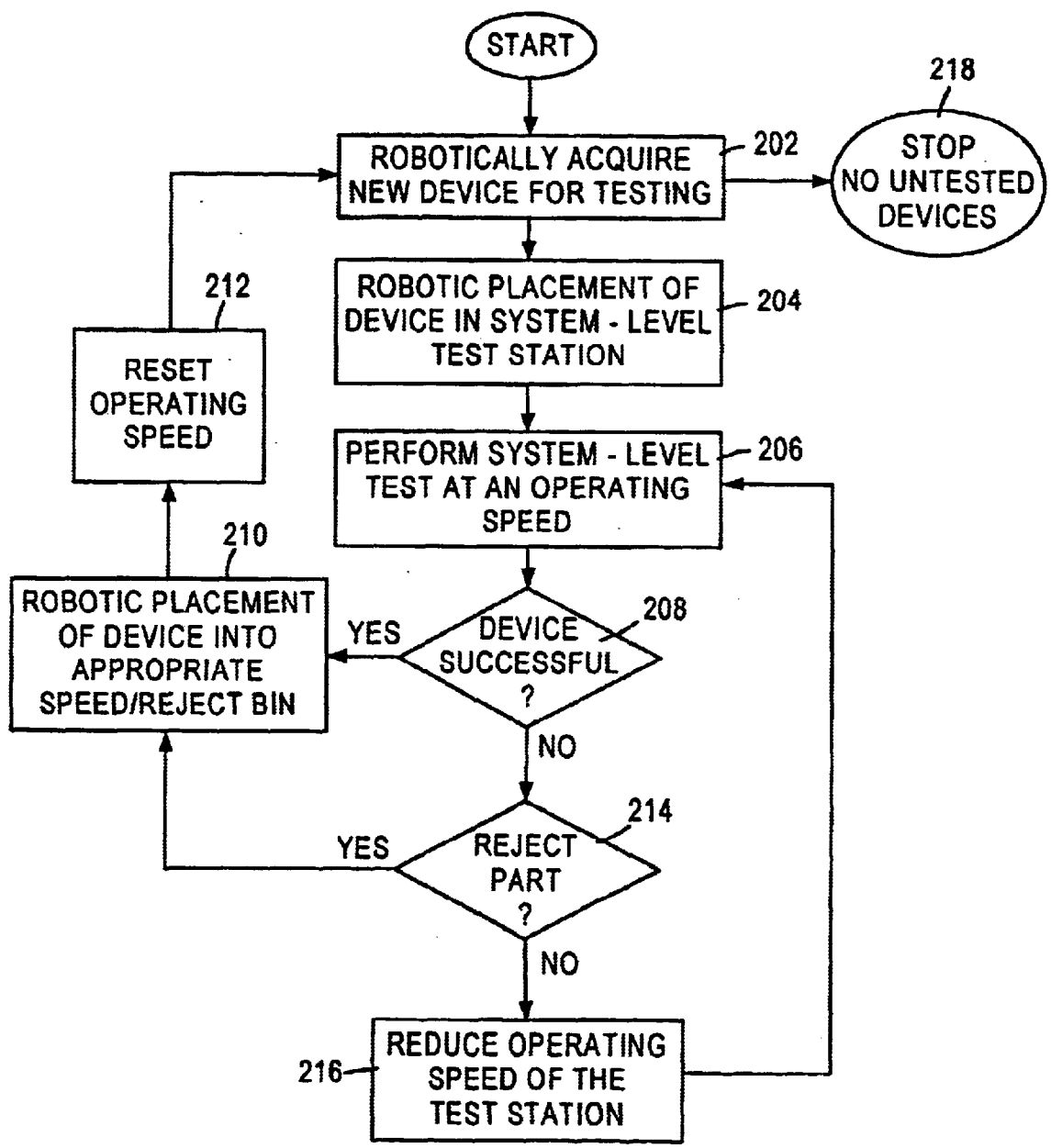
FIG. 2 illustrates a logical flow of a system-level test methodology according to the preset invention.

FIG. 2 depicts the logical flow of the test methodology of the present invention without explicitly identifying each component of the test system 100.

First, in step 202, a new device for testing is automatically acquired and, in step 204, robotically placed in the test station. Once the device is in place, a system-level test is performed. The system-level test typically includes running the device in a set-up similar to the environment it will experience when it is fielded. For a CPU or microprocessor, one system-level test set-up could include loading a number of demanding software applications (e.g. LabVIEW) and automatically running test scripts to operate these applications. The system-level testing of step 206 is performed at a particular operating speed. If the device is successful, then in step 210, the device is robotically placed in a physical location corresponding to the operating speed at which it successfully passed the test. If the device does not successfully pass the testing and its failure is not related to the operating speed, as determined in step 214, or no lower test speeds are possible, then, in step 210, the device is robotically placed in a physical location corresponding to rejected devices.

When a device fails the testing at one speed and some lower test speeds still remain for testing, the operating speed of the test station is reduced in step 216 and system-level testing repeats with the same device, at the new operating speed, in step 206. Eventually, every device is placed in an appropriate speed bin or reject bin.

Once a device is placed in an appropriate location, as in step 210, the operating speed of the test station is reset to the initial speed and testing resumes with a new device in step 202.

The above-described testing methodology of the present invention terminates, in step 218, when no untested devices remain.

The present invention provides an automated system-level test station and testing methodology which provides speed rating data for electronic devices being tested. In particular, a device is automatically placed in a test station and tested at a speed without requiring manual intervention. If the device passes, then the device is automatically removed and placed in a container according to its rating speed. If the device is rejected, then it is automatically removed and placed in a failure container. If the device is unsuccessful at one speed, then it remains in the test station, the operating speed of the test station is reduced, and the device is retested. This cycle of adjusting the operating speed and retesting is repeated until the device eventually passes the system level test, or is ultimately rejected. The rating speed at which it passes the test is used to identify the container or bin to automatically place the device in.

Due to the automation of the selection, testing, sorting and handling, errors are reduced and consequently, costs are lowered as well.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. An automated system level test apparatus comprising:
    a test station configured to receive a device under test;
    a test controller configured:
        to operate the device under test at an adjustable operating speed;
        to perform a system-level test on the device when operated at the adjustable operating speed;
        to determine if the system-level test is successfully completed and if successful, stop the test; and
        to automatically reduce the adjustable operating speed to a new operating speed and repeat the system-level test at the new operating speed, if the system-level test is not successfully completed; and
    a sorter configured to place the device under test at a location according to the adjustable operating speed at which the system-level test is successfully completed.

2. The automated system level test apparatus of claim 1, wherein the device under test is a microprocessor.

3. The automated system level test apparatus of claim 1, wherein
    the test controller is further configured to determine if a failure condition is met and to stop the system-level test if the failure condition is met, and
    the sorter is further configured to place the device at a location according to the failure condition.

4. The automated system level test apparatus of claim 1, further comprising:
    a picker/placer configured to acquire the device under test and position the device on the test station.

5. The automated system level test apparatus of claim 4, wherein the picker/placer is further configured to operate as the sorter.

6. An automated system level testing (SLT) system for a device under test comprising:
    a test station configured to receive a device under test;
    the test station further configured to operate the device under test at an adjustable operating speed;
    a robotic arm configured to pick the device under test and place the device under test on the test station;
    a tester configured to perform a test on the device under test, when operated at the adjustable operating speed, until the device under test successfully completes the test or a failure condition is met;
    a test evaluator which determines a test result from at least the following conditions:
        1) a passing operating speed at which the device under test successfully completes the test;
        2) the device under test does not successfully complete the test, and
        3) the failure condition is met;
    a clock adjuster configured to reduce the adjustable operating speed to a new speed and further configured to signal the tester to repeat the test at the new speed, if the device under test does not successfully complete the test, and
    the robotic arm further configured to place the device in a location according to the test result.

7. The automated system level testing (SLT) system of claim 6, wherein the device is a microprocessor.

8. The automated system level testing (SLT) system of claim 7, wherein the adjustable operating speed varies from a maximum of 1 GHz to a minimum of substantially 100 MHz.

9. The automated system level testing (SLT) system of claim 6, wherein the test station further comprises:
    a motherboard, including a data bus;
    a storage medium connected to the motherboard and storing procedures for conducting the test;
    a clock circuit board configured to operate at an adjustable speed, and
    a daughtercard configured to:

connect with the data bus;

receive the device under test, and receive the clock circuit board.

10. The automated system level testing (SLT) system of claim 6, wherein the test station further comprises a voltage controlled oscillator to adjust the adjustable operating speed.

11. A method of automating a system level test of a device at a test station comprising the steps:

repeating the following steps until the device successfully completes the system level test or a failure condition is reached:

a) operating the device at an adjustable operating speed;

b) performing the system level test of the device when operated at the adjustable operating speed;

c) determining if the system level test is successfully completed or if the failure condition is reached;

d) if the system level test is not successfully completed, then automatically adjusting the adjustable operating speed;

if the system level test is successfully completed, then associating with the device an operating speed at which the system level test is successfully completed, wherein the conditional step of associating with the device an operating speed includes automatically placing the device at a location based on the operating speed at which the system level test is successfully completed; and if the failure condition is reached, then rejecting the device.

12. The method of claim 11, wherein the device is a microprocessor.

13. The method of claim 11, wherein the conditional step of rejecting the device includes:

automatically placing the device in a rejection container.

14. The method of claim 11, further comprising the steps:

automatically picking the device from a set of devices, and automatically placing the device onto the test station.

15. The method of claim 11, wherein the conditional step of automatically adjusting the adjustable operating speed includes:

selecting a voltage for a voltage controlled oscillator.

16. The method of claim 11, further comprising the step of:

repeating all the steps of the method for each of a plurality of devices.

* * * * *